United States Patent [19]
Morito

[11] Patent Number: 5,664,085
[45] Date of Patent: Sep. 2, 1997

[54] METHOD OF AN APPARATUS FOR GENERATING TANGENTIAL CIRCLE

[75] Inventor: Masao Morito, Kawasaki, Japan

[73] Assignee: Fujitsu Limited, Kawasaki, Japan

[21] Appl. No.: 381,860

[22] PCT Filed: Mar. 15, 1994

[86] PCT No.: PCT/JP94/00415

§ 371 Date: Feb. 7, 1995

§ 102(e) Date: Feb. 7, 1995

[87] PCT Pub. No.: WO95/01608

PCT Pub. Date: Jan. 12, 1995

[30] Foreign Application Priority Data

Jun. 29, 1993 [JP] Japan ..................... 5-158746

[51] Int. Cl.$^6$ ............................. G06T 11/20
[52] U.S. Cl. ............................. 345/441
[58] Field of Search .................. 395/118–120, 141–143; 364/474.29

[56] References Cited

U.S. PATENT DOCUMENTS

| | | | |
|---|---|---|---|
| 4,855,926 | 8/1989 | Seki et al. | 364/474.29 |
| 5,345,546 | 9/1994 | Harada et al. | 395/142 |
| 5,410,489 | 4/1995 | Seki et al. | 364/474.29 |
| 5,410,645 | 4/1995 | Ooka et al. | 395/142 |

FOREIGN PATENT DOCUMENTS

| | | |
|---|---|---|
| 61-292705 | 12/1986 | Japan . |
| 4-372071 | 12/1992 | Japan . |
| 5-46722 | 2/1993 | Japan . |
| WO86/07645 | 12/1986 | WIPO . |

OTHER PUBLICATIONS

McCracken, et al "Computing for Engineers and Scientists with Fortran 77", *John Wiley & Sons, Inc.*, 2ed, 1988, pp. 170–235.

DeMaria, Russel, "MGMStation CAD", *BYTE* Jan. 1988; p. 178; vol. 13, No. 1.

McCarthy, Tim, "Easy arcs", *Cadcam*, v12, n2, p73(3), Feb., 1993.

Halliday, Caroline, "DesignCAD update has better speed, bigger command set; now competes with fastest low–end CAD packages, but it requires more power, RAM", *InfoWorld*, v15, n21, p148(3), May 24, 1993.

Choi, B. K., et al, "Constraint–radius Blending in Surface Modeling", *Computer Aided Design*, vol. 21, No. 4, May 1989, pp. 231–222.

Primary Examiner—Heather R. Herndon
Assistant Examiner—Rudolph Buchel
Attorney, Agent, or Firm—Staas & Halsey

[57] ABSTRACT

An operator can generate a circle stably at an intended position tangentially to figure elements such as free curves or the like. Two figure elements displayed on a screen are indicated to obtain identifiers and coordinates of indicated positions thereof (S1). Then, coordinates $c_0$ of a point on a line segment whose ends are located at the coordinates of the indicated positions are determined from these coordinates of the indicated positions, and set to coordinates "c" of the center of an initial circle (S2). An improved value is calculated on the condition that a circle having a radius "r" with center at the coordinates "c" is tangential to the two figure elements (S3). Any difference between the improved value and a preset value is detected. If the calculation of the improved value is to be repeated, then the calculated improved value is used as the preset value (S4).

18 Claims, 12 Drawing Sheets

5,664,085

METHOD OF AN APPARATUS FOR GENERATING TANGENTIAL CIRCLE

TECHNICAL FIELD

The present invention relates to a method of and an apparatus for generating a circle tangential to two figure elements including at least one free curve or ellipse, and more particularly to a method of and an apparatus for stably generating a circle or rounded corner tangential to two figure elements including at least one free curve or ellipse which is generated in an interactive system such as a CAD (computer-aided design) system.

BACKGROUND ART

CAD systems produce drawings such as design drawings on the screen of a graphic display using basic figure elements including straight lines, circles, and arcs, and also free curves such as spline curves. In designing products or decorative patterns, it is commonly practiced to round a corner composed of two figure elements or draw a circle positioned between and tangential to two figure elements, and there is available a function to draw tangential circles or rounded corners with ease.

On a two-dimensional CAD system, a corner of a rectangle can be rounded by executing a command which produces a round having a radius "r" between two figure elements. This is because if the figure to be processed is a rectangle, then the center of curvature of an arc can simply be determined by calculating the length of the radius "r" from the joint between two successive figure elements. In rectangles, therefore, rounded corners or circles tangential to two sides can easily and accurately be calculated geometrically and algebraically.

If at least one of the figure elements is a free curve which is normally called a spline or Bezier curve or an ellipse, then it is not easy to round a corner or generate a tangential circle with respect to those figure elements because the center of a tangential circle cannot be determined geometrically.

FIGS. 1(A) and 1(B) of the accompanying drawings show a tangential circle and a rounded corner, respectively, with respect to two figure elements at least one of which is a free curve. Specifically, FIG. 1(A) illustrates two figure elements $S_1$, $S_2$ which are spline curves and a circle $C_1$ having a radius "r" which is tangential to these spline curves, and FIG. 1(B) illustrates a rounded corner composed of an arc $C_2$ having a radius "r" of curvature which is positioned at a point of intersection between a straight line L and a figure element $S_3$ which is a spline curve. Generally, a convergent calculation method is employed in the generation of such a tangential circle and a rounded corner.

The convergent calculation method is a method of solution that is relied upon when no analytic solution is available. According to the convergent calculation method, a mathematical formula is produced with the condition of being tangential used as an undetermined variable, and the undetermined variable is varied, starting from a suitable initial value, until the formula converges into a final desirable solution. For example, if a figure element is a spline curve which is formed by smoothly joining a plurality of points, then since the spline curve necessarily has a start point and an end point, the start point is used as an initial value, and solutions are successively determined from the initial value. In this manner, the solutions are successively converged, searching for a region where the spline curve and a circle having a radius "r" are tangential to each other. When the region is found, the tangential circle can then be drawn by determining the center of the circle and the point where the circle is tangential to the spline curve. If a rounded corner is to be generated, then since the point of intersection between the spline curve and the tangential circle has been determined, it is similarly possible to generate and display an arc.

However, inasmuch as the undetermined variable is varied, starting from a suitable initial value, until the formula converges into a final desirable solution according to the convergent calculation method, a tangential circle may not necessarily be generated in a position intended by the operator, depending on what value is employed as the initial value.

FIG. 2 of the accompanying drawings shows tangential circles which can possibly be generated actually when a circle is to be generated tangentially to two spline curves. If there are two spline curves $S_1$, $S_2$ and convergent calculations are carried out from a start point remote from a point of intersection between these spline curves $S_1$, $S_2$ to determine a tangential circle $C_A$, then a tangential circle $C_B$, $C_C$, or $C_D$ may possibly be determined. Generally, an initial value is established in a position to easily determine the desired tangential circle $C_A$. Actually, however, if curves are complex, then a large jump may occur as the convergent calculations converge between the curves, and it is not assured that the desired tangential circle $C_A$ will necessarily be determined among the four tangential circles $C_A$, $C_B$, $C_C$, $C_D$. In some cases, the convergent calculations do not converge, but diverges or oscillates, failing to arrive at any solution.

With the conventional processes of generating a circle tangential to two free curves, as described above, a tangential circle may not necessarily be generated in a position intended by the operator, and no tangential circle may be generated at all when the convergent calculations diverge or oscillate. Consequently, the conventional processes have suffered a stability problem in the generation of a tangential circle. For this reason, it has always remained to be determined where to start converging the convergent calculations, i.e., what initial value is to be employed to start the convergent calculations, and various attempts have been made to solve the problems.

DISCLOSURE OF THE INVENTION

In view of the aforesaid problems, it is an object of the present invention to provide a method of and an apparatus for generating a circle tangential to two figure elements including a free curve, stably in a position intended by the operator.

To accomplish the above object, there is provided in accordance with the present invention a method of generating a circle having a radius "r" tangentially to two figure elements displayed on a screen, comprising the steps of: indicating a first figure element, extracting an identifier of the first figure element and coordinates of an indicated position thereon, indicating a second figure element, extracting an identifier of the second figure element and coordinates of an indicated position thereon; setting coordinates $c_0$ of a point on a line segment whose ends are located at the indicated positions, to coordinates "c" of the center of an initial circle; calculating an improved value on the condition that a circle having a radius "r" and a center at the coordinates "c" is tangential to the first and second figure elements which are indicated, based on the identifiers of the first and second figure elements, and detecting any difference between the calculated improved value and a preset value, and if the calculating step is to be repeated, carrying out the calculating step with the calculated improved value used as the preset value.

According to the present invention, there is also provided an apparatus for generating a circle having a radius "r" tangentially to two figure elements displayed on a screen, comprising curve information memory means for storing curve information of a plurality of figure elements to be displayed on the screen, display means for displaying a curve based on curve information read from the curve information memory means, indicating means for indicating an operation on a figure element displayed by the display means, figure element recognizing means for outputting an identifier of a figure element indicated by the indicating means and coordinates of an indicated position on the figure element, initial value setting means for outputting coordinates of a point on a line segment whose ends are located at coordinates of two points at the indicated positions, as an initial value of coordinates of the center of a tangential circle, calculating means for calculating coordinates of the center on the condition that a circle having a radius "r" with preset coordinates of a center as an initial value is tangential to the two figure elements, based on the identifiers of the two figure elements, and detecting means for detecting whether any difference between an improved value calculated by the calculating means and a preset value converges in a range of threshold value.

BEST MODE FOR CARRYING OUT THE INVENTION

A tangential circle generating method according to the present invention is based on the fact that when the operator of an interactive system generates a circle tangential to two figure elements, the operator first instructs the system to select two figure elements, and it is natural for the operator to instruct the system in the vicinity of the position of the figure elements where the tangential circle will be drawn.

Figure 1:
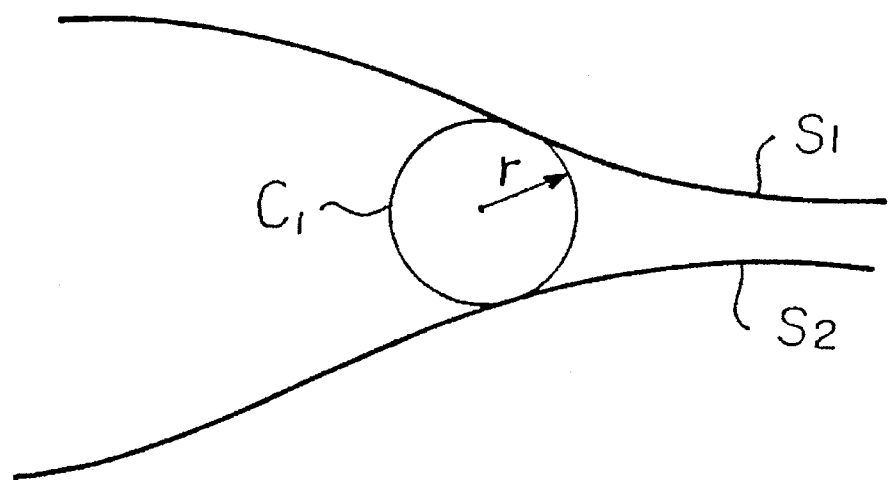
FIGS. 1(A) and 1(B) are diagrams showing a tangential circle and a rounded corner, respectively, with respect to two figure elements at least one of which is a free curve.
Figure 1:
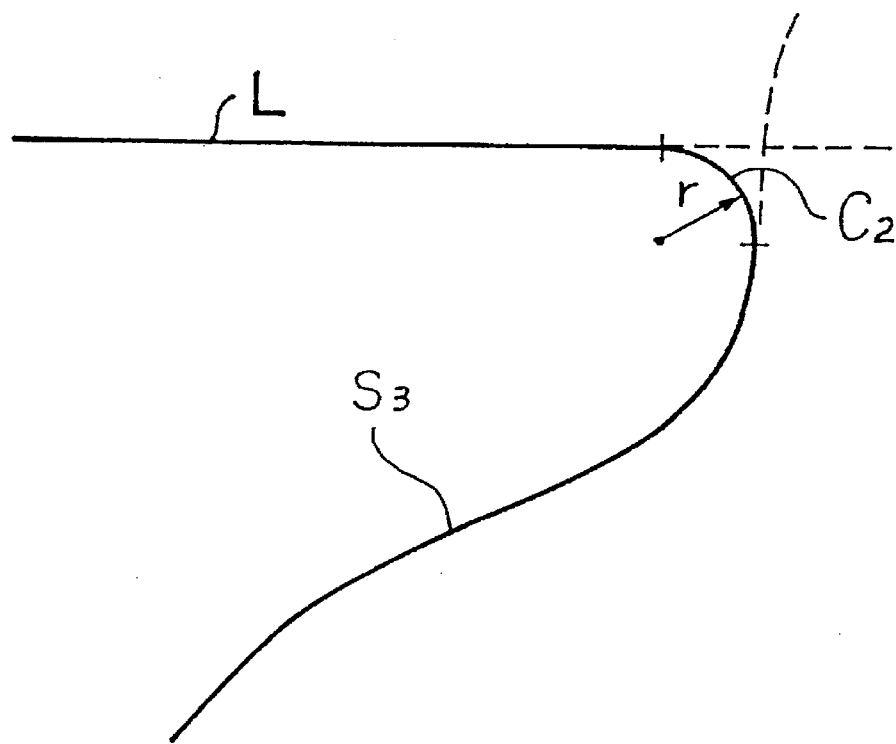
Figure 2:
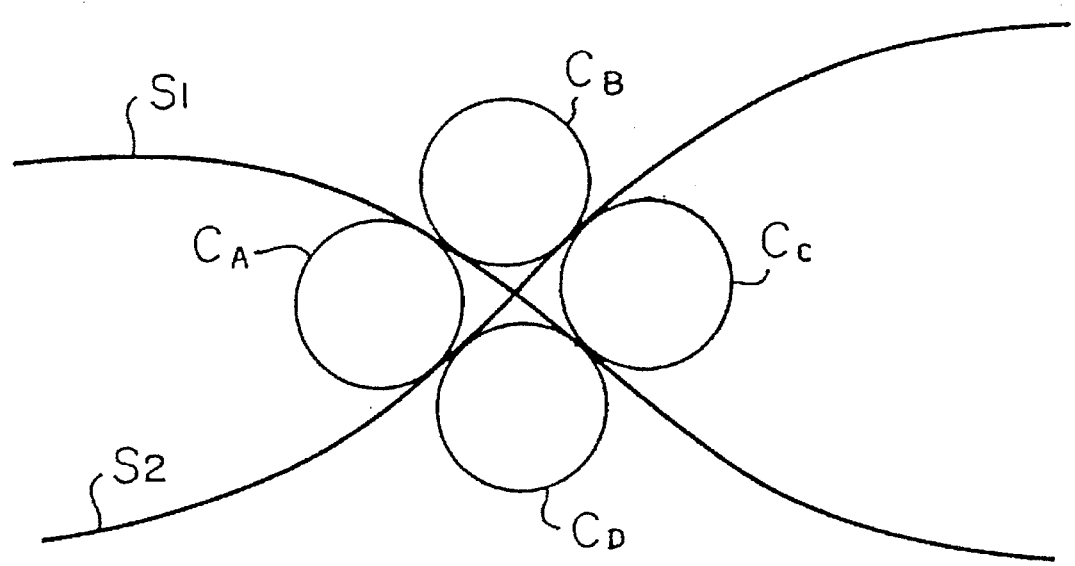
FIG. 2 is a diagram showing tangential circles which can possibly be generated actually when a circle is to generated tangentially to two spline curves.
Figure 3:
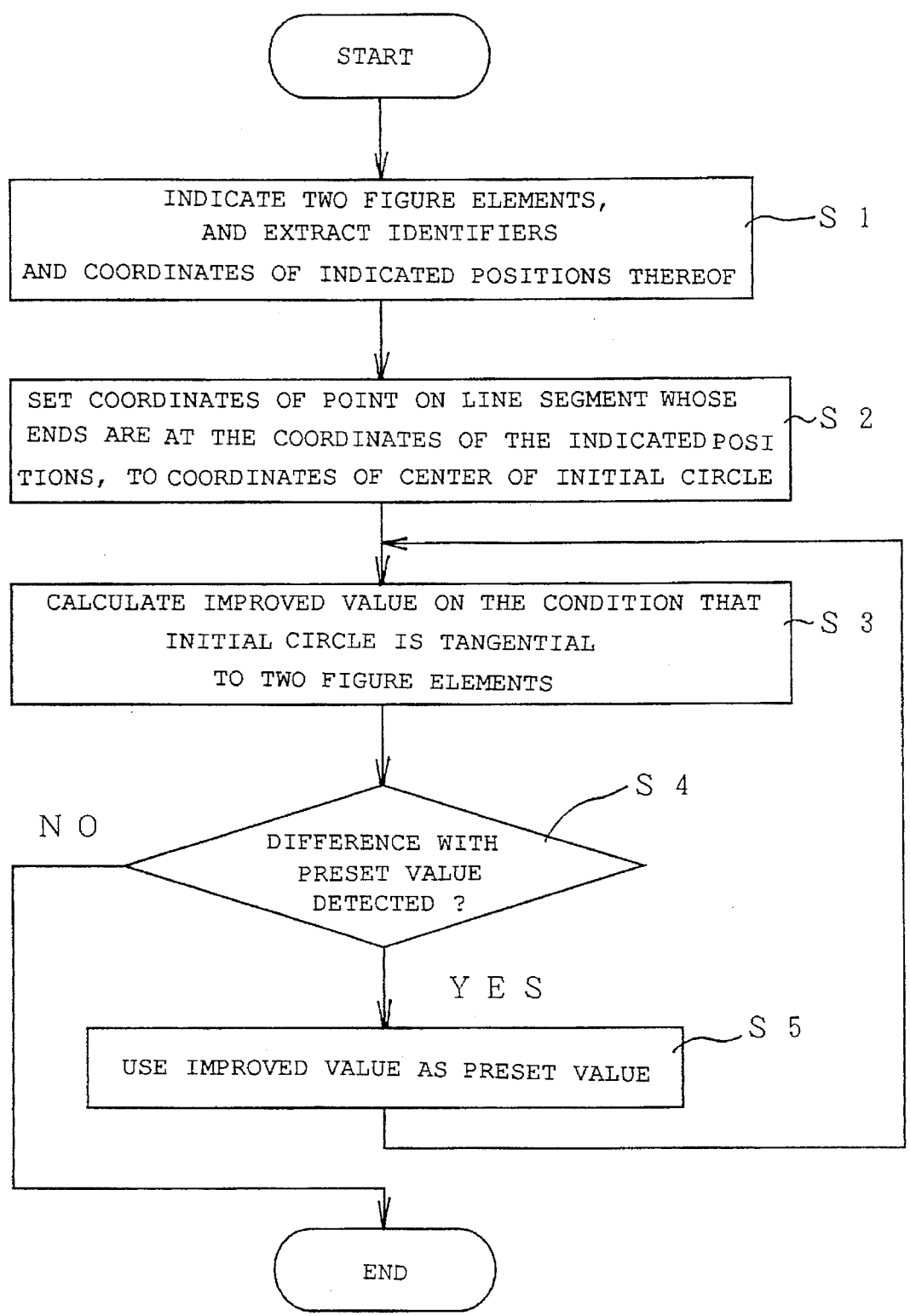
FIG. 3 is a flowchart illustrative of the principles of a tangential circle generating method according to the present invention.
Figure 4:
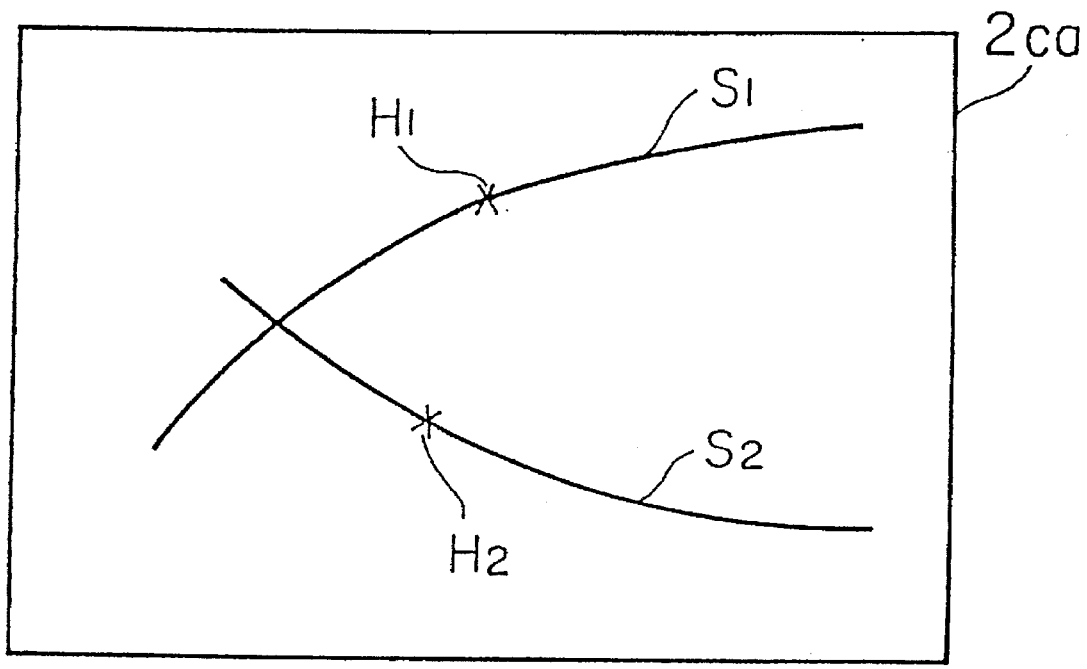
FIGS. 4(A) and 4(B) are diagrams showing examples displayed On the screen of a graphic display.
Figure 4:
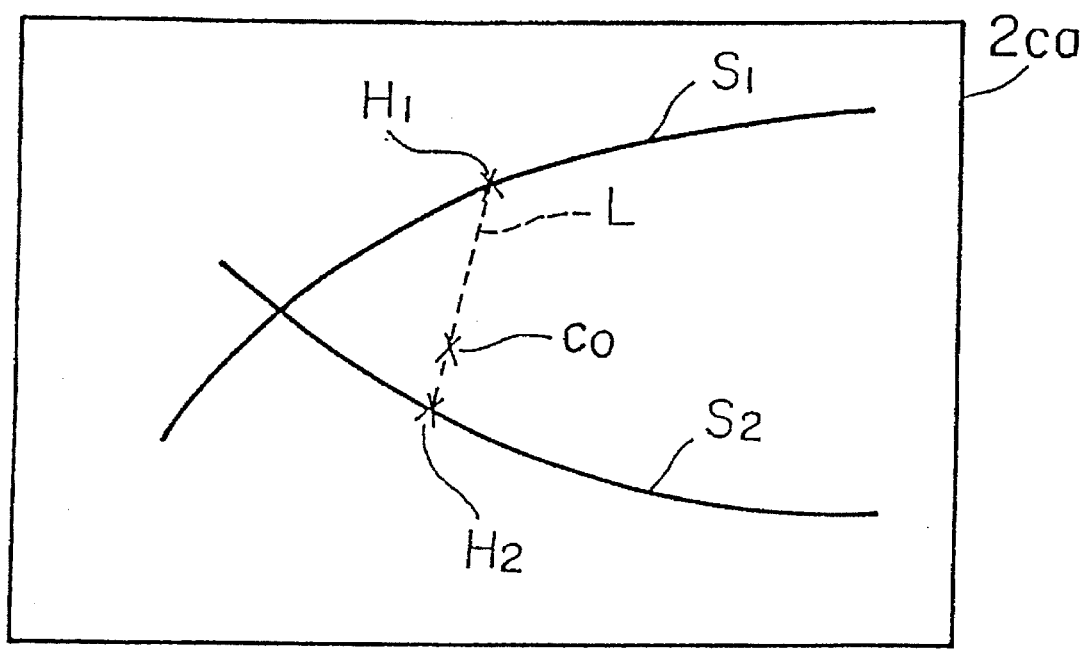

FIG. 3 is a flowchart illustrative of the principles of the tangential circle generating method according to the present invention, and FIGS. 4(A) and 4(B) are diagrams showing examples displayed on the screen of a graphic display.

It is assumed that, as shown in FIGS. 4(A) and 4(B), two figure elements $S_1$, $S_2$ at least one of which is a free curve have already been drawn on a screen 2ca of a graphic display. The tangential circle generating method according to the present invention will be described step by step with reference to FIGS. 3, 4(A), and 4(B).

Step S1

The figure element $S_1$ to which a circle is to be generated tangentially is indicated on the screen 2ca by a pointing device such as a mouse or a stylus pen. Specifically, as shown in FIG. 4(A), the cursor of the pointing device is displayed as "X" on the screen 2ca and the cursor is moved onto the figure element $S_1$ in the vicinity of the position of a tangential circle to be drawn, thereby indicating the figure element $S_1$. An identifier $ID_1$ for identifying the figure element plotted on the screen 2ca, and coordinates $H_1$ of the indicated position are now obtained. Actually, since it is not possible to indicate the figure element $S_1$ with the cursor exactly aligned with the figure element $S_1$, the coordinates $H_1$ are coordinates projected onto the figure element $S_1$ from the coordinates indicated by the pointing device.

Similarly, the figure element $S_2$ is indicated by the pointing device in the vicinity of the position of the tangential circle to be plotted. An identifier $ID_2$ which identifies the figure element $S_2$, and coordinates $H_2$ of the indicated position are now obtained.

Step S2

As shown in FIG. 4(B), coordinates $c_0$ of a point on a line segment L having ends at the coordinates $H_1$, $H_2$ are obtained from the coordinates $H_1$, $H_2$. Preferably, the coordinates $c_0$ of a point on the line segment L should be coordinates of a middle point between the coordinates $H_1$, $H_2$. The coordinates $c_0$ are established as coordinates "c" of the center of an initial circle from which to start calculations. In other words, the coordinates $c_0$ are used as the first guess of the center of the circle. Similarly, the coordinates $H_1$, $H_2$ are used as the first guess of the points of tangency. Those initial coordinate values are preset to variables of condition formulas to be described later on, thereby initializing a preset value that is to be used in convergent calculations.

Step S3

Then, an improved value is calculated on the condition that a circle having a radius "r" with its center having the established coordinates "c" is tangential to the figure elements $S_1$, $S_2$, based on the identifiers $ID_1$, $ID_2$ of the figure elements $S_1$, $S_2$. More specifically, a convergent calculation is carried out for one step using the given preset value based on conditional formulas indicating that the circle is tangential to the figure elements $S_1$, $S_2$, and the conditional formulas containing the coordinates "c" of the center of the initial circle, the indicated coordinates on the figure elements $S_1$, $S_2$, and angles up to the coordinates on the figure elements $S_1$, $S_2$ with respect to a reference line passing through the center of the initial circle, thus calculating the improved value.

Step S4

The difference between the calculated improved value and the preset value is detected. If the difference is eliminated, then the calculated improved value becomes a final value of the variables (i.e., the solution), thereby determining the coordinates of the center of the tangential circle and the points of tangency.

Step S5

If the difference between the calculated improved value and the preset value remains, then the present value is replaced with the calculated improved value as the next guess of the variables, and control returns to the step S3 in which a further improved value is calculated.

Because the central position between the coordinates indicated on the figure elements in the vicinity of the position of the figure elements where the tangential circle will be plotted is used as an initial value for convergent calculations, the initial value which is essentially close to the solution can be indicated from the outset. Consequently, the solution convergently calculated from the initial value is in substantial agreement with the position of the tangential circle which the operator wants to draw.

Figure 5:
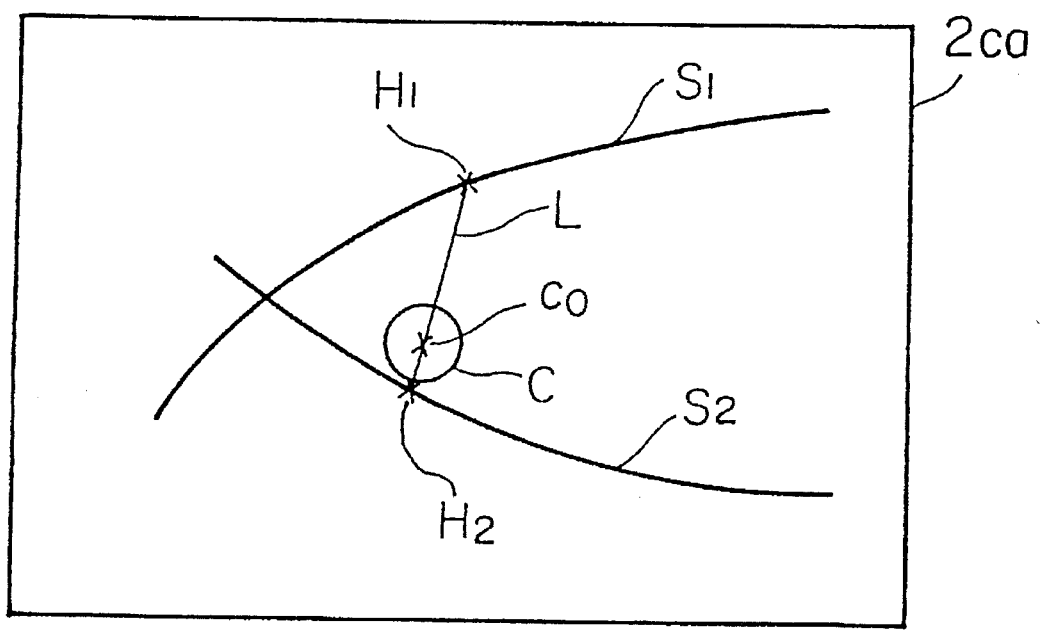
FIG. 5 is a diagram showing an example displayed on the screen according to another embodiment of the tangential circle generating method according to the present invention.

FIG. 5 is a diagram showing an example displayed on the screen according to another embodiment of the tangential circle generating method according to the present invention. In the embodiment shown in FIG. 5, after the step S2 in which the coordinates $c_0$ of a point on the line segment are established as coordinates "c" of the center of an initial circle, there is added a step of displaying an initial circle C having a radius "r" at the position of the coordinates $c_0$ of a point on a determined line segment L. In this embodiment, the radius "r" has already been given. With the initial circle C being thus displayed, it is possible for the operator to know how the CAD system recognizes a general position of a tangential circle which the operator is going to generate, and it is also possible to make the operator feel at rest because the initial circle C is temporarily displayed in the vicinity of a position where the tangential circle is to be plotted.

Figure 6:
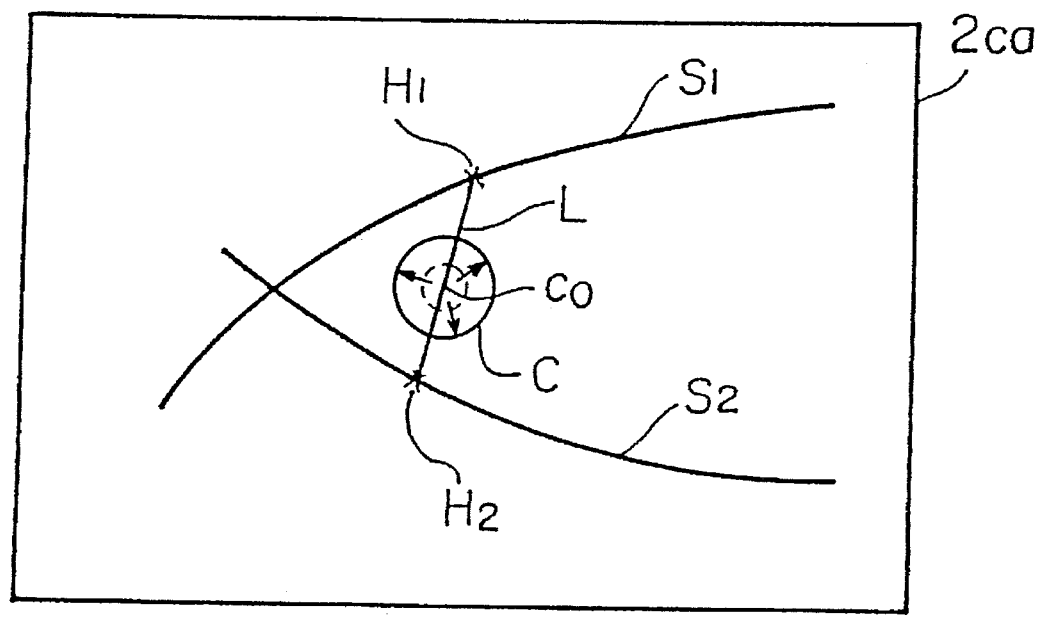
FIG. 6 is a diagram showing an example displayed on the screen according to still another embodiment of the tangential circle generating method according to the present invention.

FIG. 6 is a diagram showing an example displayed on the screen according to still another embodiment of the tangential circle generating method according to the present invention. In the embodiment shown in FIG. 6, after the step $S_2$ in which the coordinates $c_0$ of a point on the line segment are established as coordinates "c" of the center of an initial circle, there is added a step of generating and displaying a circle of any desired size at the position of the coordinates $c_0$ of a point on a line segment L. In this embodiment, when the coordinates $c_0$ on the line segment L are determined, a circle C of any desired size is generated around the coordinates $c_0$, preferably the coordinates $c_0$ positioned midway on the line segment L.

For example, after the coordinates $c_0$ are generated, a circle with its center at the coordinates $c_0$ is generated so as to grow progressively from the radius "r"=0. The generated circle C can be prevented from growing beyond the size which the operator desires, as by clicking with a mouse. Alternatively, when the circle C grows to a suitable size, the radius "r" is prevented from increasing, and thereafter the size of the circle may be increased or reduced to a desired size by moving a mouse cursor for rubber-banding. At this time, the dimensional data of the radius "r" can be displayed as a numerical value on the screen. Therefore, it is not necessary to give the radius "r" beforehand. Such a process is effective particularly in designing decorative patterns where the radius of a tangential circle is determined by the operator based on his aesthetic sense.

FIGS. 7(A), 7(B), 7(C), and 7(D) are diagrams showing examples displayed on the screen according to yet still another embodiment of the tangential circle generating method according to the present invention. In this embodiment, before figure elements to which a circle is to be generated tangentially are indicated on the screen, the size of a tangential circle is determined in advance, and a sample of a circle of the determined size is displayed to cause the operator to recognize the size of the circle (circle size data are fed back to the operator). This is because when zooming is frequently repeated, the operator would otherwise be unable to recognize how big the circle would be on the screen, and an appropriate initial value would not be obtained depending on the indicated position of the figure elements.

Figure 7A:
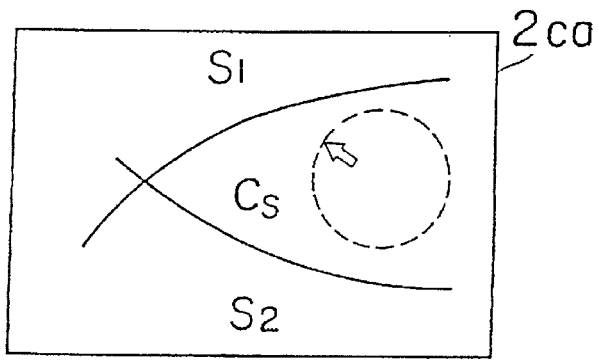
FIGS. 7(A), 7(B), 7(C), and 7(D) are diagrams showing examples displayed on the screen according to yet still another embodiment of the tangential circle generating method according to the present invention.

FIG. 7(A) shows a sample Cs of a circle having a radius "r" which is displayed on the screen in the vicinity of a cursor indicated by the arrow, at the time the radius "r" of a tangential circle to be generated is determined. The sample Cs of the circle appears such that the tip end of the cursor is positioned on the circumference of the circle at the position of 10 o'clock. When the cursor is moved, the sample Cs is also moved (dragged) with the cursor.

Figure 7B:
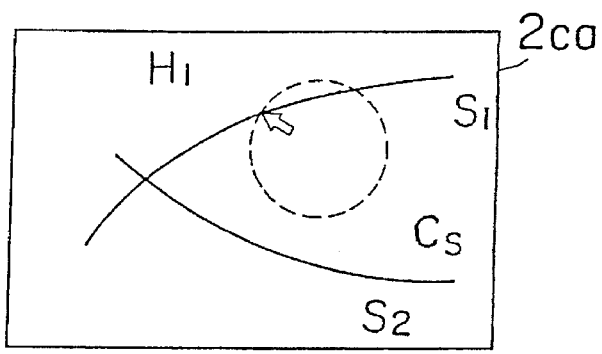

FIG. 7(B) shows the manner in which a figure element $S_1$ is indicated by moving the cursor. When the figure element $S_1$ is indicated, the figure element $S_1$ is selected. The selected figure element $S_1$ can be explicitly distinguished from another figure element when its color is changed, for example. At this time, the sample Cs has its circumferential point fixed to coordinates $H_1$ at a position where the figure element $S_1$ is indicated. When the cursor is subsequently moved, the sample Cs is moved around the coordinates $H_1$ and the cursor is moved on the circumference of the sample Cs.

Figure 7C:
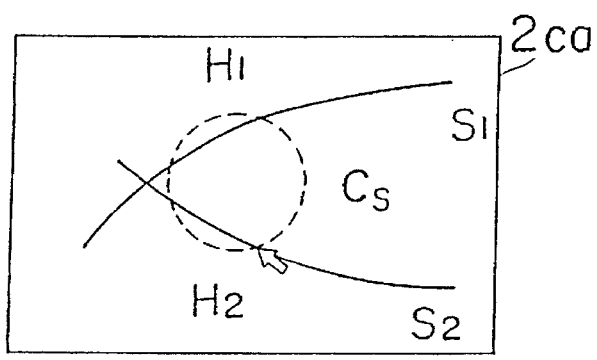

FIG. 7(C) shows the manner in which a figure element $S_2$ is indicated. When the figure element $S_2$ is indicated by the cursor, coordinates $H_2$ of the indicated position are acquired. The selected figure element $S_2$ can also be explicitly distinguished from another figure element when its color is changed. Thereafter, coordinates $c_0$ of a point on a line segment whose ends are at the coordinates $H_1$, $H_2$ where the figure elements $S_1$, $S_2$ are indicated are determined, and the position of the center of the circle is determined by convergent calculations.

Figure 7D:
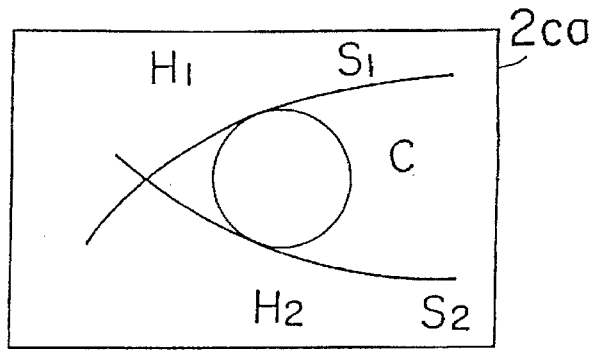

FIG. 7(D) shows the manner in which the tangential circle C is displayed at the position of the center of the circle which is determined by convergent calculations.

As described above, by displaying in advance a sample of a circle to be generated, even when a display scale is changed, the sample of the circle can be displayed with the changed display scale, and since the operator can somewhat detect an erroneous entry of the value of a radius due to an erroneous recognition of the unit system, the operator can generate a tangential circle more intuitively. Inasmuch as it is possible to obtain an accurate initial value, the problem that a tangential circle will be generated in an unexpected position is eliminated.

In the example shown in FIG. 7(A), the displayed sample Cs of the circle and the desired tangential circle C are generated with a predetermined radius. However, before figure elements to which a circle is to be generated tangentially are indicated, a circle of any desired size my be generated, and the size of the generated circle may be increased or reduced to a desired size by rubber-banding. At this time, the dimensional data of the varied radius "r" are displayed on the screen.

Figure 8:
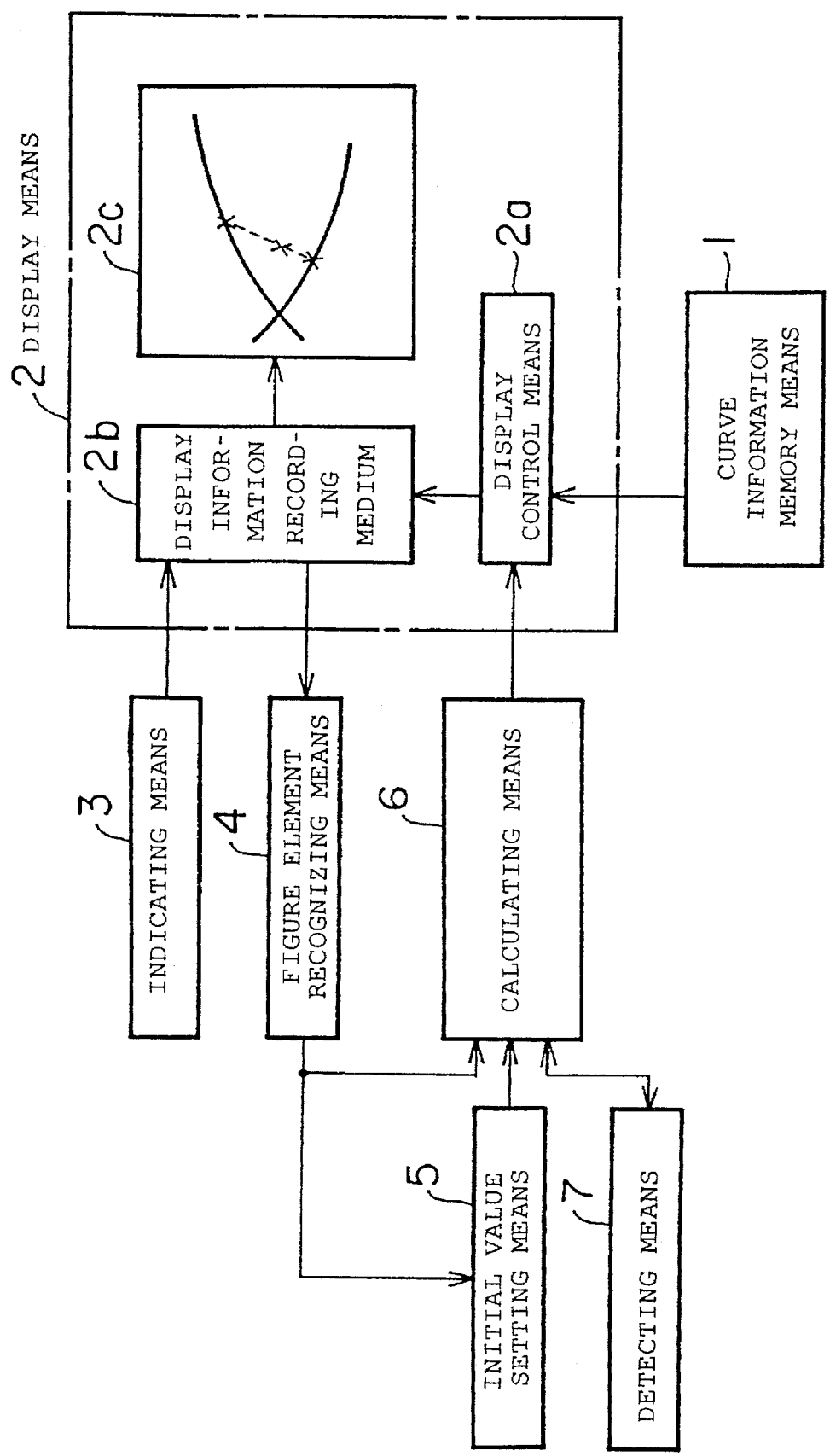
FIG. 8 is a block diagram of a tangential circle generating apparatus according to the present invention.

FIG. 8 is a block diagram of a tangential circle generating apparatus according to the present invention.

In FIG. 8, the tangential circle generating apparatus has a curve information memory means 1 for storing curve information of figure elements, and a display means 2. The display means 2 comprises a display control means 2a for converting the curve information stored in the curve information memory means 1 into display information, a display information memory means 2b for storing the display information, and a display unit 2c for displaying the display information stored in the display information memory means 2b.

The tangential circle generating apparatus also has an indicating means 3 for indicating a figure element which is being displayed by the display means 2 and determining a radius of a tangential circle to be generated, a figure element recognizing means 4 for outputting an identifier of the figure element that is indicated and indicated coordinates of a figure element, an initial value setting means 5 for outputting, as an initial value of coordinates of the center of a tangential circle, an initial value for starting calculations from coordinates of indicated positions on two selected figure elements, i.e., coordinates of a point on a line segment whose ends are located at the coordinates of the indicated positions, a calculating means 6 for calculating the coordinates of the center of a tangential circle on the condition that a circle having a radius "r" with preset center coordinates as an initial value is tangential to two figure elements based on identifiers of the two figure elements, and a detecting means 7 for detecting whether the difference between an improved value calculated by the calculating means 6 and a preset value converges within the range of a preset threshold value.

Operation of the tangential circle generating apparatus will be described below. The curve information memory means 1 stores curve information of figure elements which include free curves or ellipses generated by a CAD system, and the display means 2 displays figure elements based on the curve information. In the display means 2, the display control means 2a converts the curve information stored in the curve information memory means 1 into display information, the display information memory means 2b stores the display information, and the display unit 2c displays the display information stored in the display information memory means 2b.

To generate a tangential circle, the indicating means 3 indicates and selects two figure elements to which a circle is to be generated tangentially, from those figure element which are displayed by the display means 2. The figure element recognizing means 4 outputs identifiers and indicated coordinates of the two figure elements that have been indicated and selected by the indicating means 3. The initial value setting means 5 calculates coordinates of a point on a line segment whose ends are at the indicated coordinates, from the indicated coordinates outputted from the figure element recognizing means 4, and outputs the calculated coordinates as an initial value of the coordinates of the center of the tangential circle. The calculating means 6 calculates the position of the center of a circle having a radius "r" which is tangential to the indicated and selected figure elements by way of convergent calculations, based on the identifiers of the figure elements from the figure element recognizing means 4 and the initial value from the initial value setting means 5. The improved value calculated by the calculating means 6 is compared with a value preset before the improved value is calculated, by the detecting means 7, which determines whether the difference between the improved value and the preset value converges in the range of a preset threshold value or not. If the difference falls in the range of the preset threshold value, then the detecting means 7 instructs the calculating means 6 to finish repeated calculations that are being carried out in the calculating means 6. The calculating means 6 now instructs the display means 2 to plot a circle having a radius "r" around the calculated position. If the difference does not fall in the range of the preset threshold value, then the detecting means 7 instructs the calculating means 6 to repeat calculations using the improved value as a preset value.

Figure 9:
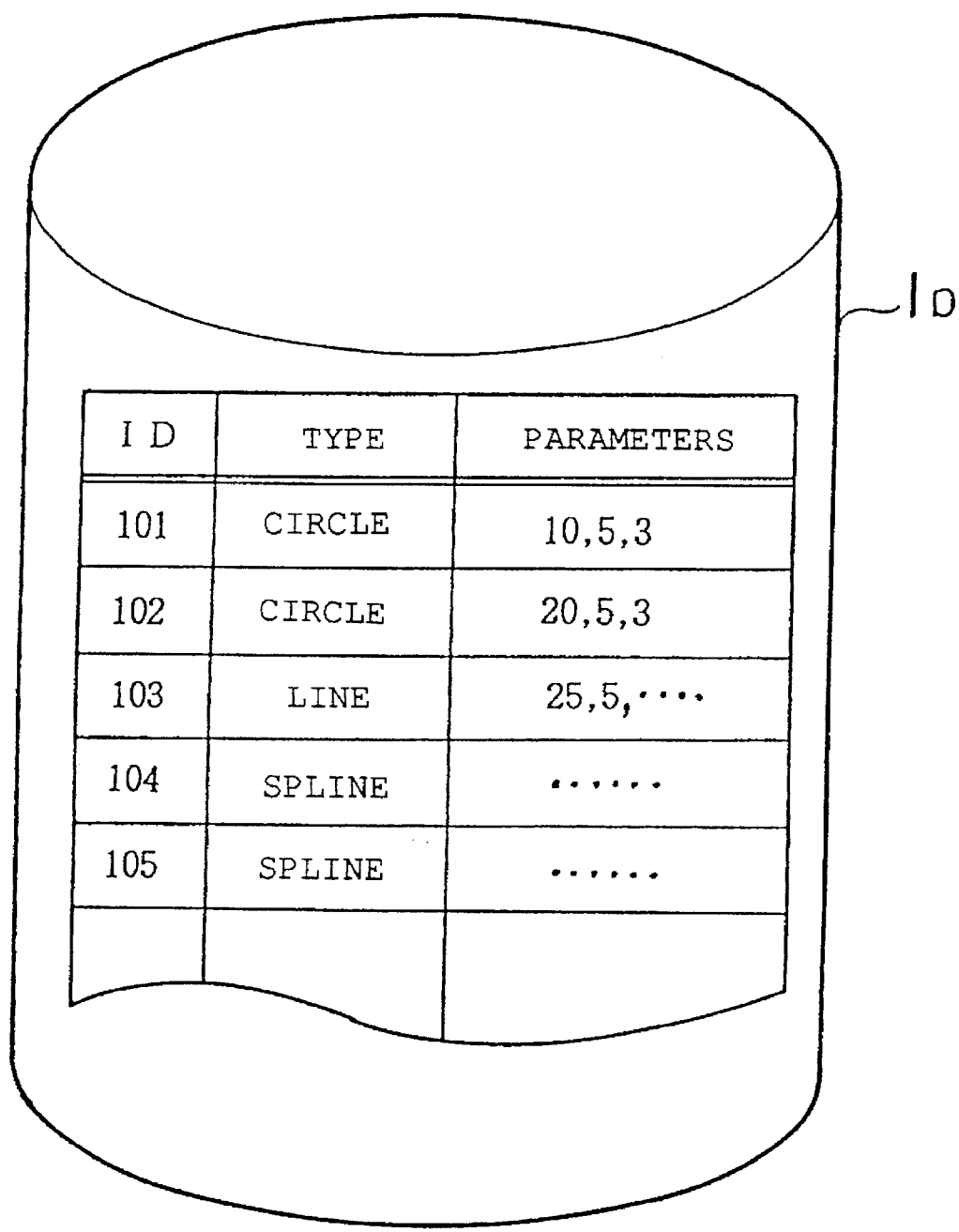
FIG. 9 is a diagram of a figure element data base.

FIG. 9 is a diagram of a figure element data base. An interactive system such as a CAD system has a figure element data base 1a in which figure elements loaded in a main memory or displayed on the screen are given respective identifiers, i.e., figure elements IDs, for identifying the figure elements. In the example shown in FIG. 9, the figure element data base 1a has identification numbers entered in a column entitled "ID", types of figure elements including a circle, a straight line, a spline curve, etc. entered in a column entitled "TYPE", and numerical values required to represent figure elements, entered in a column entitled "PARAMETERS". For example, if a figure element is of a circle type, then numerical values indicating the coordinates of the center and the radius are entered as parameters.

Figure 10:
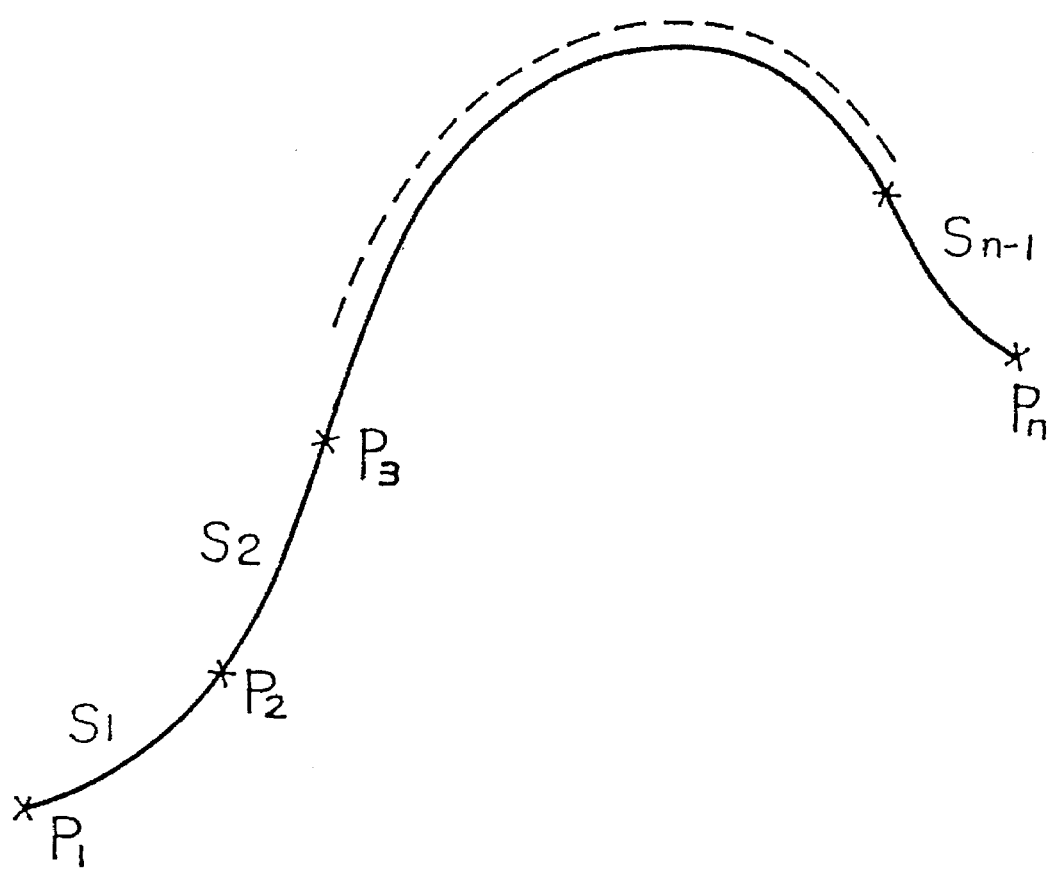
FIG. 10 is a diagram showing a spline curve which is one of free curves.

FIG. 10 is a diagram showing a spline curve which is one of free curves. In FIG. 10, $P_1, P_2, \ldots P_n$ represent given points on a spline curve, and $S_1, S_2, \ldots S_{n-1}$ represent segments (intervals) of the spline curve. The spline curve is a curve produced by smoothly interconnecting the points $P_1, P_2, \ldots P_n$, and is normally indicated by a polynomial of degree 3 between the points through which the curve passes. A spline curve indicated by a polynomial of degree 3 is called a spline curve of degree 3, and can be expressed equations given below. For example, a spline curve $S_1$ is expressed by:

$$S_{1x}(t) = a_{1x}t^3 + b_{1x}t^2 + c_{1x}t + d_{1x} \qquad \ldots (1a)$$

$$S_{1y}(t) = a_{1y}t^3 + b_{1y}t^2 + c_{1y}t + d_{1y} \qquad \ldots (1b)$$

where $a_{1x}, b_{1x}, c_{1x}, d_{1x}, a_{1y}, b_{1y}, c_{1y}, d_{1y}$ are constants, and "t" is a variable descriptive of the curve. The descriptive variable is used to represent a position indicated by a pointing device on a free curve such as a spline curve because a problem would occur if the position indicated by the pointing device were represented by coordinates. The descriptive variable corresponds to coordinates indicated on a free curve. Adjacent segments have equal vectors and radii of curvature at their ends $P_2, P_3, \ldots P_{n-1}$, so that the segments are smoothly joined.

Figure 11:
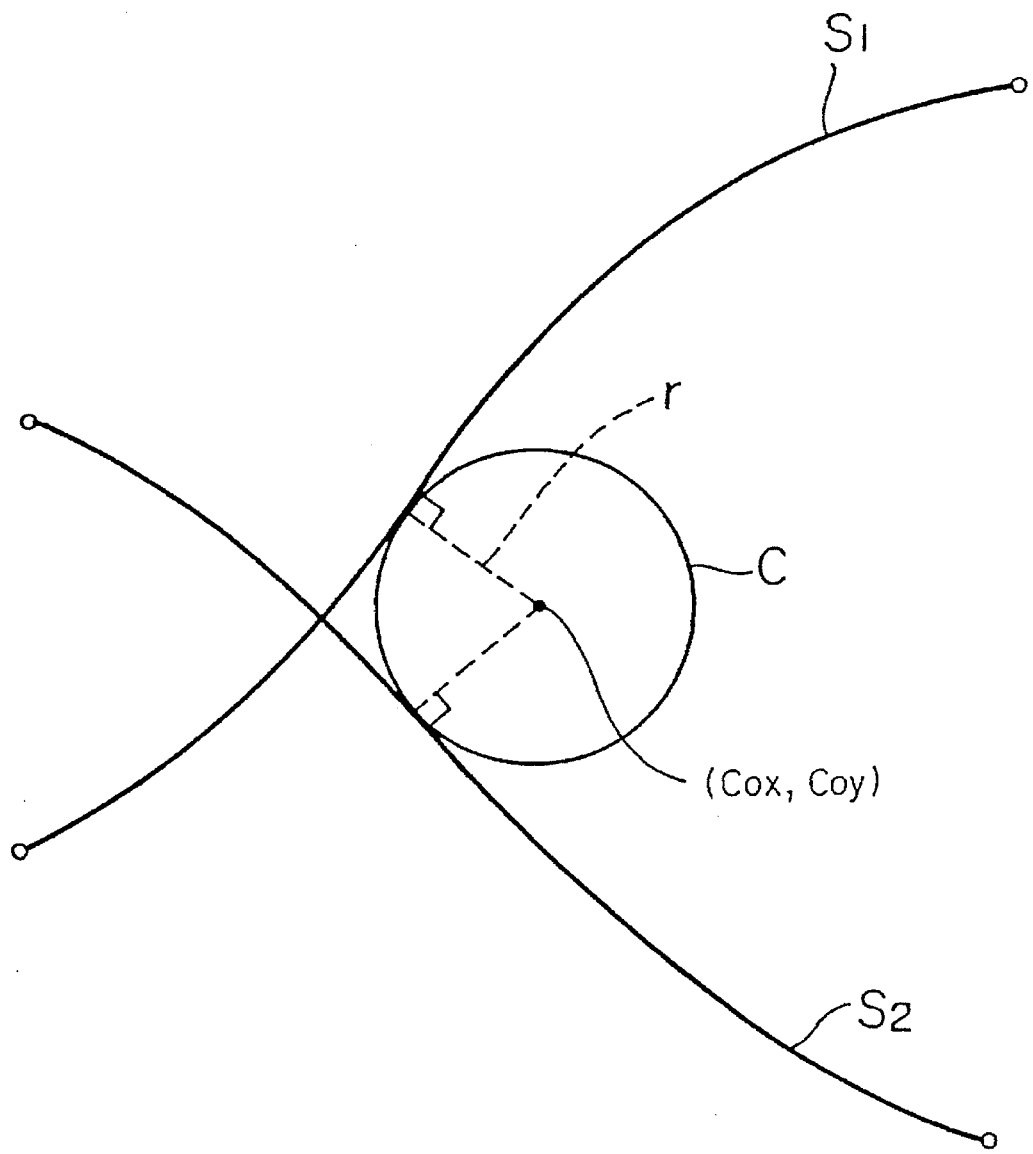
FIG. 11 is a diagram showing a circle tangential to two spline curves.

FIG. 11 is a diagram showing a circle C tangential to two spline curves $S_1, S_2$. In FIG. 11, a circle C having a radius "r" and a center at coordinates $(c_{0x}, c_{0y})$ is tangential to the two spline curves $S_1, S_2$. The circle C is a circle which is to be finally generated.

Conditional formulas indicating that the circle C is tangential to two spline curves $S_1, S_2$, which are used in the convergent calculations in the step S3 of the tangential circle generating method, are determined below. With respect to the spline curve $S_1$, the equations (1a), (1b) are differentiated once into:

$$S_{1x}'(t)=3a_{1x}t^2+2b_{1x}t+c_{1x} \quad \ldots (1c)$$

$$S_{1y}'(t)=3a_{1y}t^2+2b_{1y}t+c_{1y} \quad \ldots (1d)$$

Similarly, a spline curve $S_2$ are expressed by:

$$S_{2x}(s)=e_{2x}s^3+f_{2x}s^2+g_{2x}s+h_{2x} \quad \ldots (2a)$$

$$S_{2y}(s)=e_{2y}s^3+f_{2y}s^2+g_{2y}s+h_{2y} \quad \ldots (2b)$$

$$S_{2x}'(s)=3e_{2x}s^2+2f_{2x}s+g_{2x} \quad \ldots (2c)$$

$$S_{2y}'(s)=3e_{2y}s^2+2f_{2y}s+g_{2y} \quad \ldots (2d)$$

where $e_{2x}$, $f_{2x}$, $g_{2x}$, $h_{2x}$, $e_{2y}$, $f_{2y}$, $g_{2y}$, $h_{2y}$ are constants, and "s" is a variable descriptive of the curve. The circle C can be expressed by:

$$C_x(u)=r\cos u+c_{0x} \quad \ldots (3a)$$

$$C_y(u)=r\sin u+c_{0y} \quad \ldots (3b)$$

$$C_x'(u)=-r\sin u \quad \ldots (3c)$$

$$C_y'(u)=r\cos u \quad \ldots (3d)$$

where ($c_{0x}$, $c_{0y}$) are the coordinates of the center of the circle (arc), "r" the radius of the circle (arc), and "u" the angle up to the position where the circle (arc) is tangential to the figure element $S_1$ or $S_2$ with respect to a reference line passing through the center of the circle (arc) with the radius "r". Therefore, conditional formulas indicating that a circle is tangential to two spline curves $S_1$, $S_2$ are indicated by:

$$S_1(t) - C(u_1) = 0 \quad (4a)$$

$$(\equiv F_1(c_{0x}, c_{0y}, s, t, u_1, u_2)),$$

$$S_1'(t) \cdot C'(u_1) = 0 \quad (4b)$$

$$(\equiv F_2(c_{0x}, c_{0y}, s, t, u_1, u_2)),$$

$$S_2(s) - C(u_2) = 0 \quad (4c)$$

$$(\equiv F_3(c_{0x}, c_{0y}, s, t, u_1, u_2)),$$

$$S_2'(s) \cdot C'(u_2) = 0 \quad (4d)$$

$$(\equiv F_4(c_{0x}, c_{0y}, s, t, u_1, u_2)).$$

Coordinates of the center of a tangential circle are determined by a convergent calculation method using the conditional formulas (4a)–4(d). As the convergent calculation method, there has heretofore been known a converging process of degree 2 such as the Newton-Raphson method or the Brent method. According to the Newton-Raphson method, for example, convergent calculations are carried out using variables $c_{0x}$, $c_{0y}$, s, t, $u_1$, $u_2$. Specifically, the solutions to simultaneous equations with several unknowns:

$$F_1(c_{0x0}, c_{0y0}, s_0, t_0, u_{10}, u_{20}) \to 0 \quad \ldots (5a)$$

$$F_2(c_{0x0}, c_{0y0}, s_0, t_0, u_{10}, u_{20}) \to 0 \quad \ldots (5b)$$

$$F_3(c_{0x0}, c_{0y0}, s_0, t_0, u_{10}, u_{20}) \to 0 \quad \ldots (5c)$$

$$F_4(c_{0x0}, c_{0y0}, s_0, t_0, u_{10}, u_{20}) \to 0 \quad \ldots (5d)$$

are determined by converging from initial values $c_{0x0}$, $c_{0y0}$, $s_0$, $t_0$, $u_{10}$, $u_{20}$ of the variables determined from the indicated coordinates.

If figure elements to which a circle is to be generated tangentially are ellipses, then the center of the circle cannot be calculated geometrically and algebraically as with spline curves. Therefore, a circle tangential to ellipses is also determined according to a convergent calculation method. An ellipse is expressed as follows:

$$S_x(t)=R_x\cos t \quad \ldots (6a)$$

$$S_y(t)=R_y\sin t \quad \ldots (6b)$$

Since equations produced by differentiating these equations once are required by the convergent calculation method, the above equations are differentiated as follows:

$$S_x'(t)=-R_x\sin t \quad \ldots (6c)$$

$$S_y'(t)=R_y\cos t \quad \ldots (6d)$$

where $R_x$, $R_y$ are values on the ellipse in the direction of the x–y axis, and "t" the angle up to the positions on the ellipses to which the circle is tangential, with respect to a reference line passing through the center of the ellipse. To determine the circle tangential to the ellipses, the equations (6a)–(6d) may be applied to the equations (4a)–4(d) and the equations 5(a)–5(d).

Figure 12:
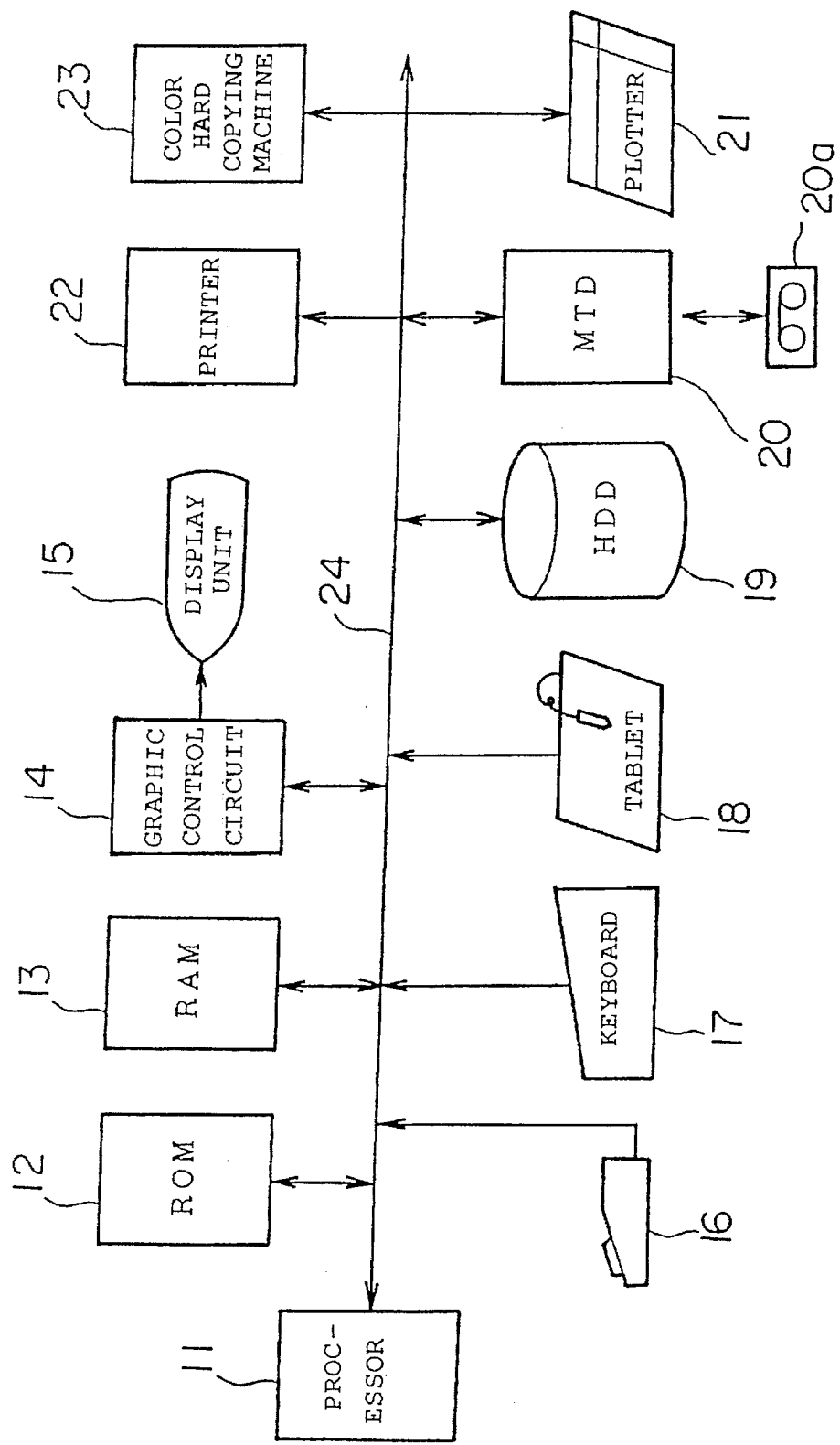
FIG. 12 is a block diagram of a hardware arrangement of a work station for carrying out the present invention.

FIG. 12 is a block diagram of a hardware arrangement of a work station for carrying out the present invention. In FIG. 12, the work station comprises a processor 11, a read-only memory (ROM) 12, a main memory (RAM) 13, a graphic control circuit 14, a display unit 15, a mouse 16, a keyboard 17, a tablet 18, a hard disk drive (HDD) 19, a magnetic tape drive (MTD) 20, a plotter 21, a printer 22, and a color hard copying machine 23. These components are interconnected by respective interface controllers (not shown) and a bus 24.

The processor 11 controls the work station as a whole. The read-only memory 12 stores programs required to start up the work station. The main memory 13 serves to store application programs of a CAD system including a tangential circle generation process, and also data while drawings are being generated and edited.

The graphic control circuit 14 converts various figure element data including two-dimensional line segment data, circle data, ellipse data, spline curve data, and tangential circle data generated in the main memory 13, into a display signal, and transmits the display signal to the display unit 15. The display unit 15 display a drawing composed of figure elements based on the received display signal.

The mouse 16 is a pointing device for moving a cursor displayed on the screen of the display unit 15, indicating a figure element displayed on the screen by clicking a button, dragging or rubber-banding a figure element which is being displayed, or indicating selections on various menus. The keyboard 17 is used to enter data such as the radius of a tangential circle. The tablet 18 is used to enter coordinates when a drawing is generated.

The hard disk drive 19 stores application programs, various figure element data required to generate drawings, and figure element IDs. The magnetic tape drive 20 is an external memory device for entering data such as a design drawing stored in a magnetic tape 20a or storing data such as a generated design drawing in the magnetic tape 20a.

Data of a generated design drawing can be outputted to and produced as a design drawing from the plotter 21, the printer 22, or the color hard copying machine 23.

With the present invention, as described above, coordinates of a point on a line segment whose ends are located at coordinates of two indicated points on first and second figure elements to which a circle is to be generated tangentially to, are determined from the coordinates of the two indicated points, and the determined coordinates are used as an initial value of the center of the circle in convergent calculations. In the convergent calculations, the initial value is converged always in the vicinity of the position where the tangential circle is to be generated. Therefore, the tangential circle can be generated essentially in the position intended by the operator, so that the stability of operation for generating a tangential circle can reliably be increased.

If an initial circle based on a radius "r" is displayed or a sample of a circle is displayed before figure elements are indicated, then when a tangential circle is to be generated, the operator can image a generated circle, and feels at rest in the generation of a tangential circle. The operator can indicate a figure element at more accurate coordinates, and hence obtain a more appropriate initial value.

I claim:

1. A method for generating a circle tangential to first and second figure elements displayed on a screen of a CAD device, comprising the steps of:

(a) indicating the first figure element, identifying a first indicated position thereon, extracting an identifier of the first figure element and coordinates of the first indicated position, indicating the second figure element, identifying a second indicated position thereon, and extracting an identifier of the second figure element and coordinates of the second indicated position;

(b) setting coordinates of a point on a line segment whose ends are located at the first and second indicated positions as a preset value representing center coordinates of the circle;

(c) convergent calculating a first improved value of the center coordinates of the circle based on the preset value, the first and second figure elements, and on condition that the circle is tangential to the first and second figure elements;

(d) detecting a difference between the first improved value and the preset value; and (e) substituting the first improved value for the preset value and convergent calculating a second improved value representing the center coordinates of the circle based on the difference of said detecting in step (d).

2. A method according to claim 1, wherein at least one of the first and second figure elements comprises a free curve connecting a plurality of coordinate points.

3. A method according to claim 2, wherein the free curve is a spline curve of degree three.

4. A method according to claim 1, wherein at least one of the first and second figure elements is an ellipse.

5. A method according to claim 1, further comprising the step (f) displaying on the screen the circle with the preset value representing the center coordinates of the circle.

6. A method according to claim 1 or 5, wherein the circle with the preset value representing the center coordinates of the circle has a predetermined radius.

7. A method according to claim 6, further comprising the step (f) changing a radius of the circle to follow a change in the first or second indicated position, and displaying on the screen at least one of the circle and dimensional data of the circle.

8. A method according to claim 1, further comprising the step (f) displaying the circle with coordinates of a point on a circumference thereof being the first or second indicated position.

9. A method according to claim 8, further comprising the step (g) moving the circle to follow a change in the first or second indicated position.

10. A method according to claim 8, wherein the circle has a predetermined radius.

11. A method according to claim 8, wherein said indicating in step (a) includes requesting generation of the circle displayed in step (f).

12. A method according to claim 10 or 11, further comprising the step (g) changing a radius of the circle to follow a change in the first or second indicated position, and displaying on the screen at least one of the circle and dimensional data of the circle.

13. A method according to claim 1, wherein said convergent calculating of step (c) convergent calculates the first improved value using a converging process of degree two.

14. A method according to claim 1, wherein said setting in step (b) sets the preset value to coordinates of a middle point between the indicated positions.

15. An apparatus for generating a circle tangential to two figure elements displayed on a screen of a CAD device, comprising:

curve information memory means for storing curve information of the two figure elements to be displayed on the screen;

display means for displaying the two figure elements and a curve based on the curve information;

indicating means for indicating an operation on the two figure elements displayed by said display means and identifying an indicated position on each of the two figure elements;

figure element recognizing means for outputting an identifier for each of the two figure elements and coordinates of the indicated position on each of the two figure elements;

initial value setting means for outputting the coordinates of the indicated position on each of the two figure elements and coordinates of a point on a line segment between the indicated position on each of the two figure elements as a preset value representing center coordinates of the circle;

calculating means for convergent calculating an improved value representing the center coordinates of the circle based on the preset value, the identifiers of the two figure elements, and on condition that the circle is tangential to the two figure elements; and detecting means for detecting whether a difference between the improved value and the preset value converges in a threshold range.

16. An apparatus according to claim 15, wherein the operation indicated by said indicating means is to indicate and select one of the two figure elements.

17. An apparatus according to claim 15, wherein the operation indicated by said indicating means is to move the center coordinates or update a radius of the circle.

18. An apparatus according to claim 14, wherein the preset value is a middle point of the line segment.

* * * * *